US012511298B2

United States Patent
Zoldi et al.

(10) Patent No.: US 12,511,298 B2
(45) Date of Patent: Dec. 30, 2025

(54) FAST AUTOMATIC EXPLANATION OF SCORED OBSERVATIONS

(71) Applicant: Fair Isaac Corporation, Minneapolis, MN (US)

(72) Inventors: Scott Michael Zoldi, San Diego, CA (US); Gerald Fahner, Austin, TX (US)

(73) Assignee: Fair Isaac Corporation, Minneapolis, MN (US)

( * ) Notice: Subject to any disclaimer, the term of this patent is extended or adjusted under 35 U.S.C. 154(b) by 0 days.

(21) Appl. No.: 18/459,156

(22) Filed: Aug. 31, 2023

(65) Prior Publication Data

US 2024/0061849 A1 Feb. 22, 2024

Related U.S. Application Data

(60) Continuation of application No. 17/317,855, filed on May 11, 2021, now Pat. No. 11,748,360, which is a division of application No. 15/368,518, filed on Dec. 2, 2016, now Pat. No. 11,042,551.

(51) Int. Cl.
G06F 16/2457 (2019.01)
G06F 16/2455 (2019.01)
G06F 16/248 (2019.01)
G06F 16/28 (2019.01)

(52) U.S. Cl.
CPC .. G06F 16/24578 (2019.01); G06F 16/24554 (2019.01); G06F 16/248 (2019.01); G06F 16/285 (2019.01)

(58) Field of Classification Search
CPC ............. G06F 16/24578; G06F 16/285; G06F 16/24554; G06F 16/248
See application file for complete search history.

(56) References Cited

U.S. PATENT DOCUMENTS

| | | | | |
|---|---|---|---|---|
| 5,696,907 | A * | 12/1997 | Tom | G06Q 40/08 705/38 |
| 5,745,654 | A * | 4/1998 | Titan | G06N 3/105 706/50 |
| 2003/0014378 | A1* | 1/2003 | Goodnight | G06N 3/045 706/26 |
| 2007/0087756 | A1* | 4/2007 | Hoffberg | G06Q 10/06375 455/450 |
| 2010/0317420 | A1* | 12/2010 | Hoffberg | G06Q 30/0282 463/1 |
| 2012/0271553 | A1* | 10/2012 | McCulloch | G06F 18/2115 702/19 |

(Continued)

OTHER PUBLICATIONS

Hababou et al. (2006)."Variable Selection in the Credit Card Industry," North East SAS users Group, SAS Institute. http://facultyweb.kennesaw.edu/jpriestl/courses/binary/RBS%20PAPER.pdf/hfacultyweb.kennesaw.edu/jpriestl/courses/binary/RBS%20PAPER.pdf.

(Continued)

Primary Examiner — Mark E Hershley

(57) ABSTRACT

Systems and methods for generating concise explanations of scored observations that strike good, and computationally efficient, trade-offs between rank-ordering performance and explainability of scored observations are disclosed. The systems and methods described herein for explaining scored observations are based on a framework of partial dependence functions (PDFs), multi-layered neural networks (MNNs), and Latent Explanations Neural Network Scoring (LENNS).

20 Claims, 5 Drawing Sheets

(56) References Cited

U.S. PATENT DOCUMENTS

| | | | |
|---|---|---|---|
| 2013/0254787 A1* | 9/2013 | Cox | H04N 21/252 725/13 |
| 2015/0339572 A1* | 11/2015 | Achin | G06N 5/04 706/46 |
| 2015/0370993 A1* | 12/2015 | Moturu | G16H 50/50 703/6 |
| 2016/0140320 A1* | 5/2016 | Moturu | G09B 7/06 434/236 |
| 2016/0202239 A1* | 7/2016 | Voros | G01N 33/6893 506/13 |
| 2016/0224703 A1* | 8/2016 | Shriver | G06Q 10/0631 |
| 2016/0364511 A1* | 12/2016 | Kirshner | G06N 20/20 |
| 2017/0000422 A1* | 1/2017 | Moturu | A61B 5/0022 |
| 2017/0017903 A1* | 1/2017 | Gray | G06T 11/60 |
| 2017/0078392 A1* | 3/2017 | Gray | H04L 67/02 |
| 2017/0122889 A1* | 5/2017 | Weindorf | G01N 21/359 |
| 2018/0025407 A1* | 1/2018 | Zhang | G06Q 10/02 705/26.81 |
| 2018/0060738 A1* | 3/2018 | Achin | G06N 20/00 |
| 2018/0096295 A1* | 4/2018 | Wang | G06Q 10/0833 |
| 2018/0140648 A1* | 5/2018 | Segal | A61P 3/08 |
| 2018/0276861 A1* | 9/2018 | Wright | G06N 3/084 |
| 2020/0143005 A1* | 5/2020 | Nair | G06F 16/2246 |

OTHER PUBLICATIONS

J.H. Friedman (2001). "Greedy function approximation: A gradient boosting machine," Annals of Statistics, 29(5):1189-1232. 39 pages.

Kang, S. and Isik, C. (2005). "Partially Connected Feedforward Neural Networks Structured by Input Types," IEEE Transaction on Neural Networks (16)(1), 175-184.

* cited by examiner

FAST AUTOMATIC EXPLANATION OF SCORED OBSERVATIONS

CROSS-REFERENCE

This application is a continuation of U.S. patent application Ser. No. 17/317,855, filed on May 11, 2021, which is a divisional of U.S. patent application Ser. No. 15/368,518, filed Dec. 2, 2016. All these patent applications are incorporated herein by reference in its entireties.

TECHNICAL FIELD

The subject matter described herein relates to scoring systems and methods for fraud, credit and other applications, and more particularly to a system and method for providing a fast explanation of scored observations.

BACKGROUND

Increasingly, high-volume business decisions are being automated through scoring by computing systems. Examples include credit, fraud, cybersecurity, insurance and marketing scores. Scored entities can be customers, prospects, accounts or devices. Underlying a score is a function or formula (also referred to herein as a "model") that is executed by a computing system on received input data, where the input data consist of P input variables describing observable properties of entities, such as demographic attributes, credit bureau characteristics, account transactions and/or sensor readings.

For each observation, the function maps its input values x1-xP into a number, the score S:

$$S = f(x1, x2, \ldots, xP; \text{model parameters})$$

The score takes on values in a score range. The functional form depends on the type of scoring model and its parameters, which are determined by a model developer to achieve certain objectives.

The primary objective of model development is for the score to rank-order the observations with respect to business metrics of interest associated with the entities, such as a probability of future default or fraud by a bank customer, likelihood of a cyberattack on a device, expected insurance loss on a car, or propensity to redeem a marketing coupon for a consumer. Many techniques exist for developing and selecting rank-ordering models, including judgmental models based on algorithms representing expert opinion, unsupervised learning where models are developed from input observations alone, and supervised learning where models are developed from pairs of input observations and associated outcomes, such as default/non-default, fraud/non-fraud, response/non-response, or monetary gain or loss. Various modeling technologies support more or less complicated score functions, ranging from simple linear functions with few parameters to complex nonlinear functions with many parameters. Deciding on the appropriate technology is a key aspect of model development, besides optimizing the model's parameters for the rank ordering objective.

A secondary objective of model development is to be able to explain scores assigned to observations to stakeholders on the basis of these observations. Use cases for score explanations include:

US regulations require that reasons explaining credit scores must be provided to rejected loan applicants.
In the fraud and cyber security areas, score explanations inform risk managers and IT personnel about the most important drivers of risk for accounts, cases, or devices deemed risky enough to warrant review by trained members of staff.
In credit scoring, consumers receive helpful explanations regarding which inputs into the model they could chose to improve with the goal of improving their future scores, or which inputs they should seek to maintain in order to protect their future scores from declining. This use case applies independent of possible regulations.
More generally, providing improvement or maintenance feedback to individuals on the basis of a model and scored observations, applies to potentially many areas where undesirable behaviors can be modified to improve future outcomes, or desirable behaviors can be reinforced to maintain future outcomes, such as: improving or reinforcing car driving behaviors based on safe driving scores, or improving or reinforcing personal health based on health scores.

Score functions often depend nonlinearly on input variables. Complex nonlinear models (such as Multilayer Neural Networks or Boosted Regression Trees) often outperform simple linear models (such as Ordinary Linear or Logistic Regression) in terms of the primary rank-ordering objective. But complex models are generally harder to explain and therefore tend to fall short on the secondary objective described above.

In general it is impossible to create explanations of arbitrary nonlinear functional dependences in arbitrarily complex score models, unless potentially crude approximations are made. Accordingly, what is needed are systems and methods employing models that are suitably constructed and constrained, such that scored observations can be concisely explained.

SUMMARY

This document presents several implementations of systems and methods for generating concise explanations of scored observations that strike good, and computationally efficient, trade-offs between rank-ordering performance and explainability of scored observations. Systems and methods described herein for explaining scored observations are based on a framework of partial dependence functions (PDFs). With this framework, concise explanations are possible if a model's functional form can be described by low-dimensional PDFs, where low-dimensional typically means one-dimensional, or at most two-dimensional, and when higher-dimensional PDFs add no new information. To achieve sufficiency of low-dimensional PDFs, the techniques described herein moderately constrain complex nonlinear scoring functions, as constraining models to be linear tends to be overly simplistic, and could often substantially hurt the primary rank-ordering performance objective.

In one aspect, a system and method are provided to efficiently and rapidly compute score explanations for suitably explainability-constrained nonlinear models at time of scoring. The method is based on pre-computing and storing one dimensional PDFs in look-up tables offline, and by combining this tabled information with scored observations, in real-time, to automatically compute fast explanations for the scored observations.

In another aspect, a system and method are provided that applies moderate explainability constraints to a first complex modelling technology: Boosted Decision Trees (BDT). Constraints guarantee that low-dimensional PDFs suffice to explain scored observations by restricted BDT models.

In yet another aspect, a system and method are provided that applies moderate explainability constraints to a second complex modelling technology: Multilayer Neural Networks (MNN). Constraints guarantee that low-dimensional PDFs suffice to explain scored observations by restricted MNN models.

In yet another aspect, a "Latent Explanations Neural Network Scoring" (LENNS) system and method is provided. The LENNS system and method are related to the aforementioned MNN models, and are designed to greatly simplify explanations of scored observations by explainability-constrained MNN models. The simplification provided by these systems and methods allows explanations of MNN scored observations on the basis of meaningful latent variables that are computed in the networks' hidden layers, instead of basing explanations on the model's input variables.

In one particular aspect, a method for providing fast automatic explanations of scored observations is disclosed. The method includes steps implemented by a computer. The steps include computing, by at least one processor, plurality of one-dimensional partial dependence functions (PDFs) according to past scored observations derived from a scoring model, the scoring model using input observations from a data set, the data set being representative of future observations according to historical data representing past activity. The steps further include storing, by the at least one processor, the plurality of one dimensional PDFs in a look-up table of a computing system, and receiving, in real-time by the at least one processor, a present scored observation of a present activity. The steps further include combining, by the at least one processor, the plurality of one dimensional PDFs from the look-up table with the present scored observation to generate one or more explanations for the present scored observation.

In another particular aspect, a method for providing fast automatic explanations of scored observations includes generating, by at least one processor, a multi-layered collection of processing neurons linked via directed, weighted interconnections to define a multi-layered neural network (MNN). The MNN has a set of input neurons and a single output neuron to model a score function for scoring an observation of an activity. The method further includes restricting, by the at least one processor, a connectivity between layers of the multi-layered collection of processing neurons of the MNN, so as to inhibit the score function from modeling interactions between at least some of the processing neurons via the weighted interconnections to produce a plurality of nonlinear univariate functions. The method further includes generating, by the at least one processor executing the MNN, a score for the observation based on a weighted combination of the plurality of nonlinear univariate functions. The method further includes generating, by the at least one processor, one or more explanations for the score, each of the one or more explanations being associated with a nonlinear univariate function. In yet other particular aspects, the method can further include partitioning, by the at least one processor, input variables to the MNN according to input representing a meaning of each input variable provided by a domain expert.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
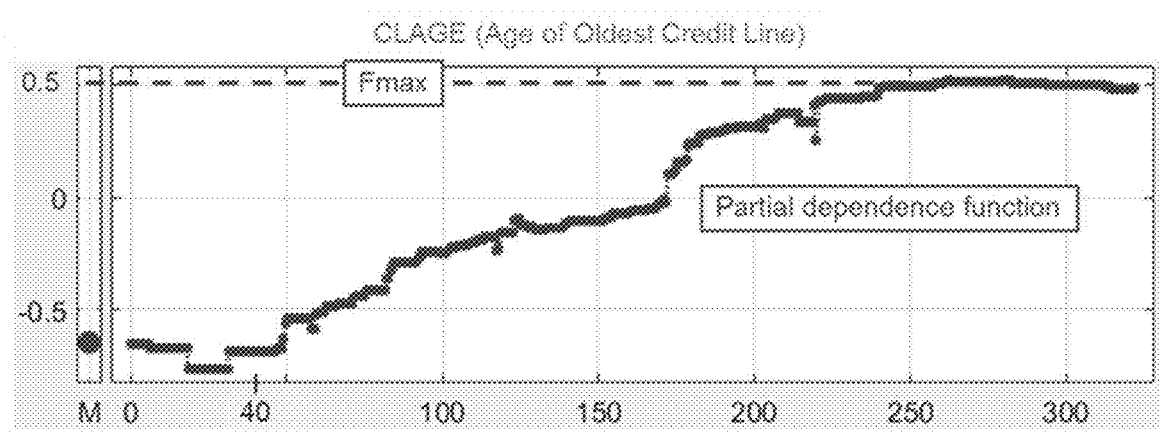
FIG. 1 illustrates a partial dependence function for a data set related to a scoring model.

To address the issues with currently available solutions, methods, systems, articles of manufacture, and the like, are presented for explaining scored observations based on the framework of partial dependence functions (PDFs). With this framework, concise explanations are possible if a model's functional form can be described by low-dimensional PDFs, where low-dimensional typically means one-dimensional, or at most two-dimensional, and when higher-dimensional PDFs add no new information.

To achieve sufficiency of low-dimensional PDFs, the systems and methods described herein constrain complex scoring functions, albeit moderately so as to not be overly simplistic (such as linear), as such overly simplistic scoring functions can adversely impact the primary rank-ordering performance objective of a scoring model. In preferred exemplary implementations, a system and method for generating concise explanations of scored observations are computationally efficient, yet acknowledge trade-offs between rank-ordering performance and explainability of scored observations.

In one implementation, a system and method are provided to efficiently and rapidly compute score explanations for suitably explainability-constrained nonlinear models at time of scoring. The method includes pre-computing and storing one dimensional PDFs in look-up tables offline, and then combining this tabled information with scored observations in real-time, to compute fast explanations for the scored observations. In another implementation, a system and method are provided that applies moderate explainability constraints to a first complex modelling technology: Boosted Decision Trees (BDT). Constraints guarantee that low-dimensional PDFs suffice to explain scored observations by restricted BDT models. In yet another implementation, a system and method are provided that applies moderate explainability constraints to a second complex modelling technology: Multilayer Neural Networks (MNN). Constraints guarantee that low-dimensional PDFs suffice to explain scored observations by restricted MNN models. In yet another implementation, a "Latent Explanations Neural Network Scoring" (LENNS) system and method, is provided. The LENNS system and method are related to the aforementioned MNN models, and are designed to greatly simplify explanations of scored observations by explainability-constrained MNN models. The simplification provided by these systems and methods allows explanations of MNN scored observations on the basis of meaningful latent variables that are computed in the networks' hidden layers, instead of basing explanations on the model's input variables.

Compute Score Reasons from One Dimensional PDFs

In accordance with some implementations, a model is developed, and access to input observations from a data set is provided, where the data set is representative of a future population on which the model will be used. Often this data set is the same data set that is used to develop the model, but this does not need to be the case.

In accordance with credit scoring use case for instance, per convention, higher credit scores indicate better credit quality and are thus more desirable. In other domains, such as fraud, higher scores mean worse risk and are thus less desirable. The systems and methods described herein can be easily adapted to those domains.

Notation:
D: Model development data set (i.e. historic data of loan application variables tagged with subsequent loan performance)
M: Model that has been fitted to data D
x1 to xP: Set of input variables entering model M describing loan applications (P>=1).
Each input variable has a user-defined textual score explanation assigned to it, which can take any of these 3 forms:
<variable description> (without further qualification)
<variable description> 'is too high'
<variable description> 'is too low'
Z1 to ZP: Values of input variables for a certain new credit application to be scored by model M, for which a score explanation is sought.

Construction of Look-Up Tables

Look up tables are constructed as follows:

First, P one-dimensional partial dependence function lookup tables, T1 to TP, are computed. There is one table per predictive attribute. Table Tj (j=1, P) stores values of the partial dependence function Fj(xj), in the case of a numeric input variable, for a set of equidistant prediction points chosen between the empirical minimum and maximum of the attribute xj in data set D, see FIG. 1. As shown in FIG. 1, numeric variables are allowed to have special value categories such as "Missing", for which their partial dependence function values are stored. In the case of a categorical input variable, the partial dependence function values for its categorical values are stored.

Next, the partial dependence function maxima, Fjmax for tables Tj (j=1, P) is computed. Interest in the maxima assumes, without loss of generality, that higher scores correspond to higher qualities of a business metric. Refer again to FIG. 1. As shown in FIG. 1, a PDF for input variable CLAGE (i.e., "Age of Oldest Credit Line") is given in months. Prediction points range from 0 to 318 months. The function has been computed for ca. 100 grid points, with equidistant values between 0 and 318, and for a special value labeled 'M', indicating "missingness." The maximum of the partial dependence function is Fmax=0.5. The PDF plot reveals that the model assigns generally higher credit scores to applicants with higher age of oldest credit lines. The look-up table corresponding to the function exemplified in FIG. 1 may consist of ca. 100 value pairs underlying the partial dependence function plotted in FIG. 1.

Next, tables Tj (j=1, P), along with their maxima Fjmax, are stored in a database PDF, as illustrated below in Table 1.

TABLE 1

Look-up table for attribute "CLAGE"

| | Prediction points $x_{CLAGE}$ | | | | | |
|---|---|---|---|---|---|---|
| | 'M' | 0 | 3 | 6 | ... 315 | 318 |
| Partial dependence values $F_{CLAGE}$ | −0.651 | −0.651 | −0.651 | −0.687 | ... 0.491 | 0.495 |

Generation of Score Explanations

Figure 2:
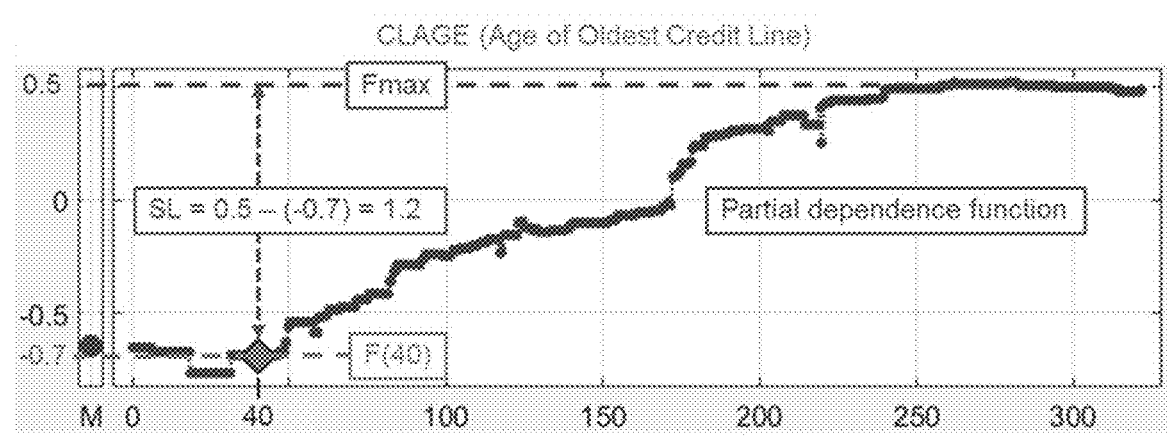
FIG. 2 illustrates how a score loss is computed for a set of inputs.

This process is performed by a computing system on-line and in real-time each time a new application is being scored. This process is independent of the score computation and can thus be performed before, concurrent with, or after the application score has been computed. Generation of score explanations is executed as follows:

First, given input values of the current application, the database PDF is queried to look up associated partial dependence values Fj(Zj) (j=1, P), see FIG. 2. If a variable value does not match any prediction points in its table, the system resorts to the prediction point nearest to the value, or interpolates based on near neighbors.

Next, score Loss $SL_j = F_{jmax} - F_j(Z_j)$ (j=1, ..., P) is calculated for each input value. FIG. 2 illustrates how the score loss is computed for one of the inputs, using an example of a Score Loss calculation for CLAGE. Consider an observation with input value $Z_{CLAGE} = 40$. The associated partial dependence value $F_{CLAGE}(40) = -0.7$ is looked up. The associated Score Loss is calculated as: $SL_{CLAGE} = F_{CLAGE}\max - F_{CLAGE}(40) = 0.5 - (-0.7) = 1.2$. This can be interpreted as follows: Because the model assigns higher scores for applicants with older credit lines, and because this applicant's oldest credit line is fairly young with 40 months, this applicant loses 1.2 score points against what the applicant could have maximally "earned" if the applicant's oldest credit line was much older. The associated explanation can be generated as "Age of Oldest Credit Line is too low."

Next, score Loss values SLj associated with the input values for the current application, are sorted in descending order. Because providing too many explanations to the stakeholder can lead to confusion, typically only 3-5 explanations are provided, starting with the input variable that incurs the highest Score Loss, as illustrated in Table 2. The number of explanations is configurable by the designer or the user of the explanation system.

TABLE 2

Score Explanation

| Score Loss (descending order) | Associated Score Explanation |
| --- | --- |
| 1.67 | "Debt Ratio is too high" |
| 1.20 | "Age of Oldest Credit Line is too low" |
| 0.71 | "Number of Late Payments is too high" |
| 0.53 | "Balance is too high" |

The score explanation report shown in Table 2 includes the input variables with the top four Score Losses for a certain credit application. The Score Loss column is shown here for didactic reasons. In some implementations, only the Score Explanation column may be displayed.

Boosted Decision Trees Constrained for Explainability

Boosting is a technology for improving the performance of a base prediction technology whereby the base technology produces simple models. Boosting works by sequentially applying the base prediction technology to reweighted versions of the development data sample; thereby producing a more complex model that combines many base models. Boosted Decision Trees (BDT) use shallow Classification and Regression Trees (CART) as its base technology. The term "shallow" means that the base CART trees have only few tree levels. BDT generates hundreds to thousands or more of shallow CART trees, and aggregates their predictions together in the form of a weighted sum to produce very powerful predictive models. BDT models also comprise thousands of parameters which are individually meaningless and cannot be understood by direct inspection. Depending on the number of levels of the base trees, the resulting scores of BTD models can be highly complex nonlinear functions of the input variables. This can create problems for explaining scored observations for generic BDT models.

Explainability Constraints for BDT

For guaranteeing explainability, the number of levels of the shallow trees is restricted to 1. Per convention the root of tree is level 0. Restriction of the tree to level 1 guarantees that the base trees and hence the resulting BDT model, being a weighted sum of shallow tree partial scores, does not model any interactions between input variables, i.e. is an additive model. As a consequence, one dimensional PDFs suffice to explain the scored observations, which can be accomplished by pre-computing and storing one dimensional PDFs in look-up tables offline, as described above. In practice additive models and one dimensional PDFs are often sufficient to obtain models that perform strongly and generate explainable scores.

Depending on data properties and wherever non-additive interactions between input variables are substantial enough that they should be captured by the model to improve on the rank ordering objective, the restriction to level 1 and the associated one-dimensional PDFs can be relaxed. PDFs can indeed be generated for arbitrary dimensions. For example, in order to capture pairwise interactions between input variables, shallow trees are restricted to level 2 and both one dimensional and two dimensional PDFs and their look-up tables are generated to serve as the basis for explaining the scores.

Multilayer Neural Nets Constrained for Explainability

A neural network (NN) is an information processing structure that transforms a set of inputs into a set of outputs. The manner in which this transformation is performed is inspired by researchers' understanding of how the human brain processes information. Specifically, a NN is a collection of simple processing units ("neurons") linked via directed, weighted interconnections. Each neuron receives a number of inputs from the outside world and/or other neurons, weights these inputs based on the weights of the corresponding interconnections, combines these weighted inputs, produces an output based on this combined input, and passes this output either to other neurons via the appropriate weighted interconnections, or to the outer world. Mathematically, this process can be represented by a function that maps the set of inputs to the set of outputs. In general, this function is non-additive and nonlinear. For the purpose of scoring, consider NN's with a single output to model the score function. Depending on the number of neurons and their interconnections, the resulting scores can be highly complex nonlinear functions of the input variables, and the connection weights tend to be individually meaningless. This can create problems for explaining scored observations for generic NN models.

Explainability Constraints for MNN

Figure 3:
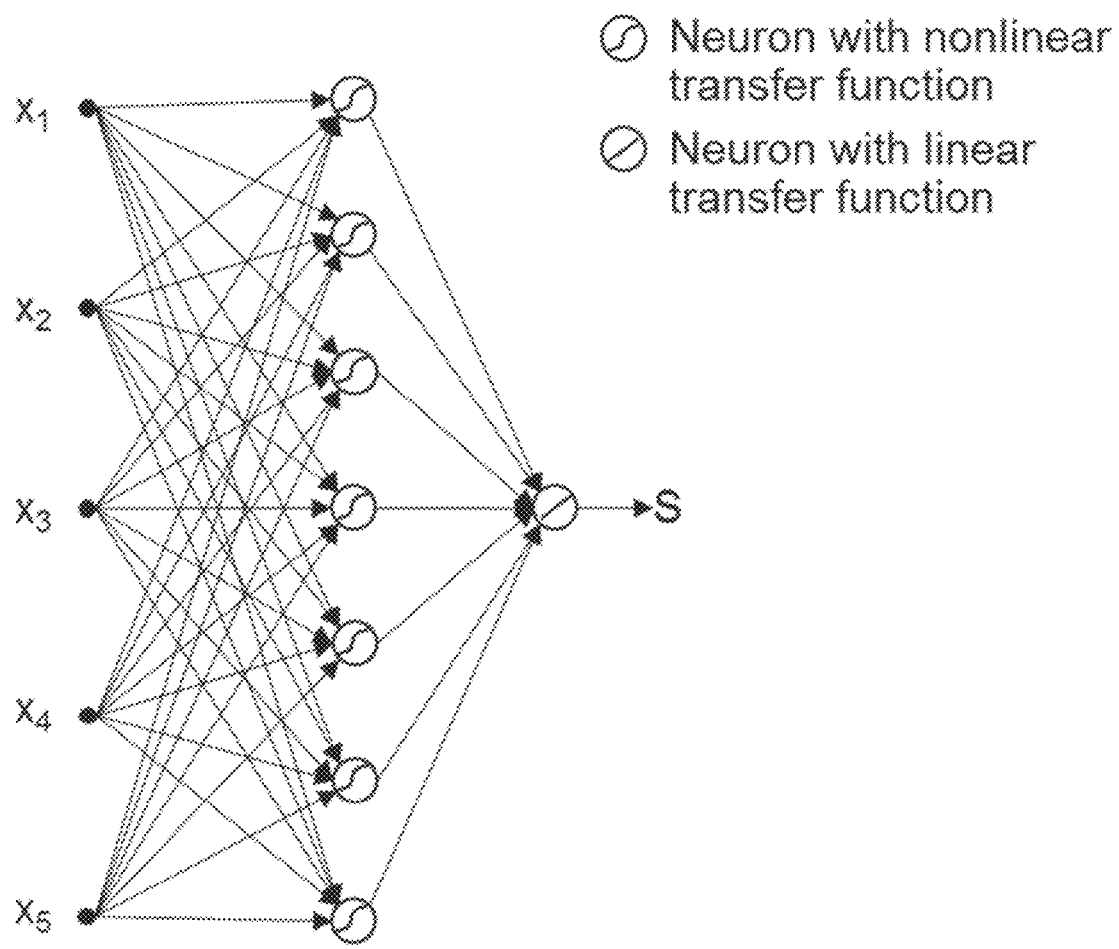
FIG. 3 is a schematic diagram of a fully connected multilayer neural network (MNN) with 5 input variables, one hidden layer with 7 hidden neurons, and one output neuron which emits the score.

An important aspect of the development of a NN is the definition of the network structure or topology—i.e., how the neurons are interconnected. In some implementations, a system and method includes one or more Multilayer Neural Networks (MNN) where the neurons are structured in layers. Generic MNN models have full connectivity between the layers, i.e. all input units are connected to all units in the first hidden layer, which connect to all units in in the second hidden layer, etc. until all units in the last hidden layer connect to the output neuron. In some implementations of the systems and methods disclosed herein, one hidden layer is used, as shown in FIG. 3. FIG. 3 is a schematic diagram of a fully connected MNN with 5 input variables, one hidden layer with 7 hidden neurons, and one output neuron which emits the score.

Fully connected MNN's can be difficult to explain and are thus widely regarded as "black boxes." Two options are described herein, both based on restricting MNN connectivity in ways that render the scores explainable by design, while retaining the MNN advantage over simple linear models which is the ability to model nonlinear relationships between inputs and score.

Figure 4:
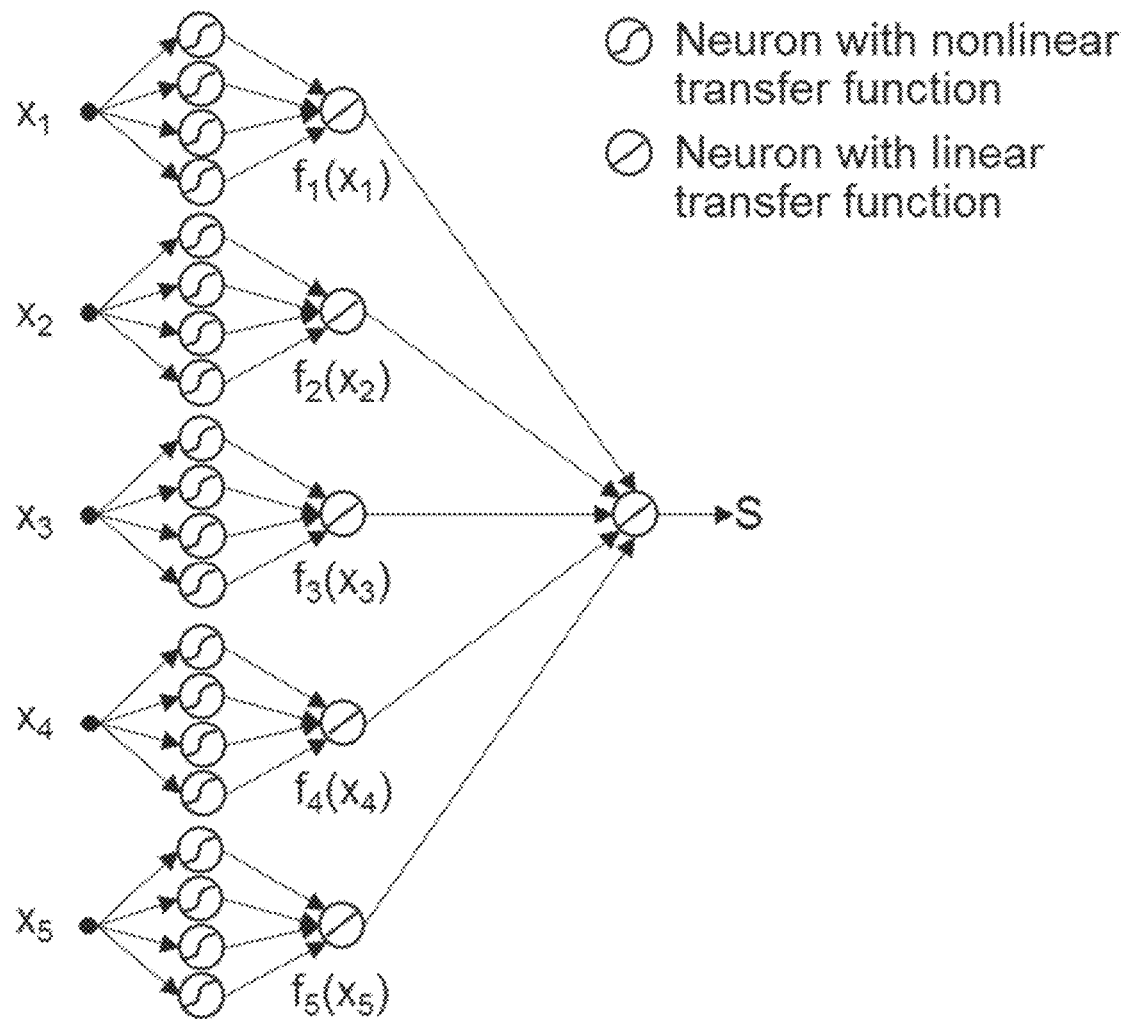
FIG. 4 is a schematic diagram of an additive MNN with 5 input variables.

Option 1: MNN connectivity is constrained such that MNN is additive in the input variables. See FIG. 4 for an example, which shows a schematic diagram of an additive MNN with 5 input variables. In contrast to the fully connected MNN, each input variable has its own associated hidden layer. Each hidden layer can have several hidden neurons, in the example diagram each hidden layer has 4 neurons. All hidden neurons belonging to input variable j are connected to a single neuron which models a nonlinear univariate function $f_j(x_j)$ of the respective input variable. Finally, the score is a weighted combination of these univariate functions.

This guarantees that the MNN score does not model any interactions between input variables. Accordingly, one dimensional PDFs suffice to explain the scored observations, which can be accomplished by pre-computing and storing one dimensional PDFs in look-up tables offline, as described herein.

Option 2 "Latent Explanations Neural Network Scoring" (LENNS): the input variables are partitioned into groups. This can be accomplished by a domain expert based on the meaning of the input variables. Groups of variables are defined to convey a similar meaning in relation to the scoring problem. Alternatively, or complementing domain expertise, exploratory data analysis can be used to guide the grouping, such as variable clustering or principal component analysis. Given a partition of input variables into a number of groups, the connectivity graph for the LENNS model can be constructed, as seen in FIG. 5 as an example.

Figure 5:
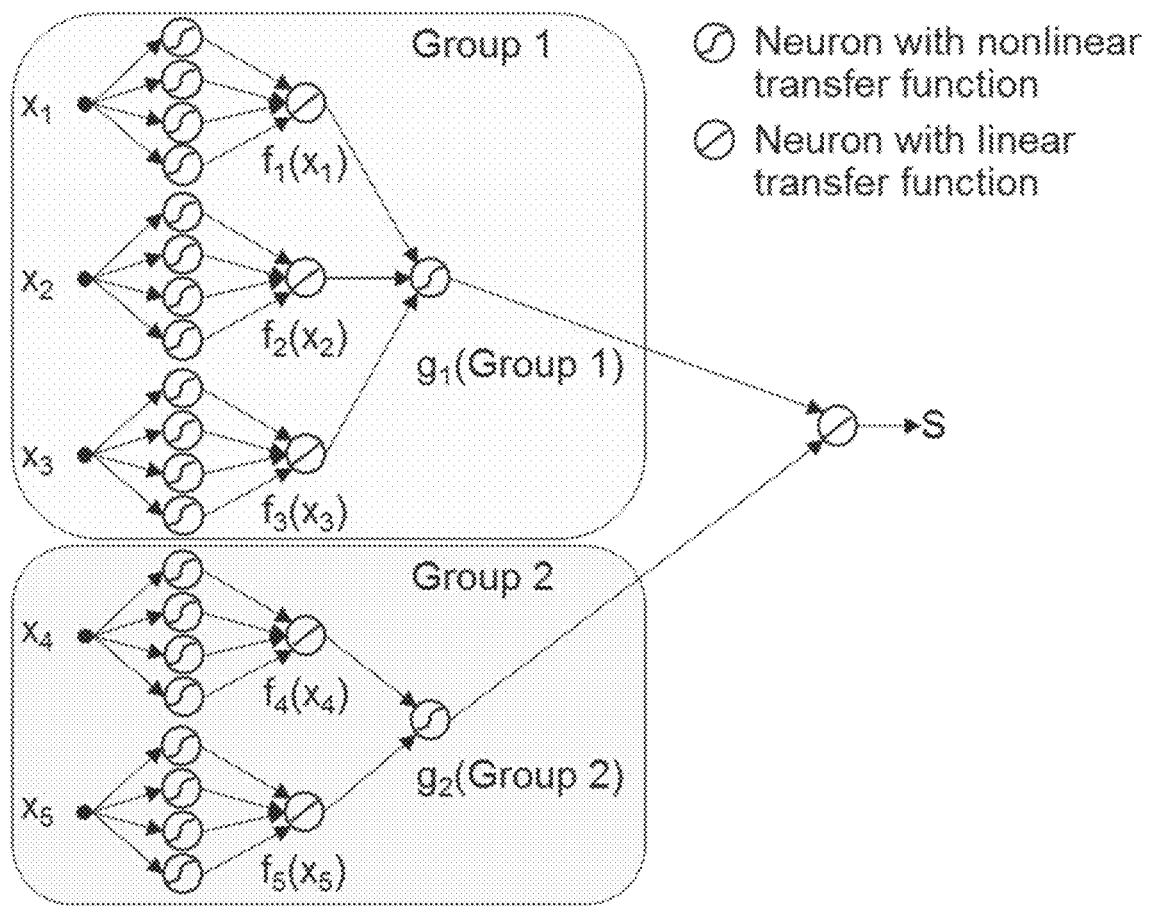
FIG. 5 is a schematic diagram of a latent explanation neural network scoring model.

FIG. 5 is a schematic diagram of a LENNS model, and showing, as an example, 5 input variables are partitioned into 2 groups. Group 1 comprises 3 input variables, Group 2 comprises 2 input variables. Just as in Option 1, each input variable has its own hidden layer from which a nonlinear univariate function $f_j(x_j)$ of the respective input variable is generated. LENNS adds an additional hidden layer of neurons that compute group part-scores $g_k(Group\ k)$. Finally, the score is a weighted combination of these group part-scores.

Connectivity is tailored in a fashion that enforces the formation of nonlinear group part-scores. Each group part-score can be thought of as a nonlinear dimensionality reduction of all the input variables making up the respective group. Each group part-score summarizes the signal from all of the group's input variables in a manner that's optimal for the rank-ordering objective. The total score computed by LENNS is a weighted sum of the group part-scores. This allows the total score of scored observations to be explained not in terms of the original input variables, but rather in terms of the group part-scores. The model architecture further guarantees that the LENNS total score does not model any interactions between the group part-scores. Therefore, one dimensional PDFs suffice to explain the scored observations on the basis of the group part-scores, which can be accomplished by pre-computing and storing one dimensional PDFs in look-up tables offline as described above.

Credit Scoring Example for LENNS

A first group of input variables may relate to applicants' historic credit repayment performance, a second group of input variables may relate to stress factors on the applicants' current financial situation, and a third group of input variables may relate to the applicants' social stability.

The system and method described herein has a number of advantages. Unnecessary and unhelpful detail in the explanations stemming from minor differences between similar input variables within the same group is removed and replaced by broader-based explanations based on the meaning of the group. Further, the number of possible explanations is reduced from the number of input variables to the often much smaller number of groups. Correspondingly fewer PDF look-up tables and look-ups are needed, reducing computational efforts and speeding up explanation of scored observations. The exact relationship between input variables and latent variables remains shielded from explanations. Finally, the ability of adversarial players to manipulate their scores by manipulating selected inputs is impaired.

LENNS models are capable of capturing interaction effects between input variables from the same group, which additive MNN's proposed in the literature do not. As a consequence, LENNS models are more flexible than additive MNN's, which increases their potential for higher performance on the rank-ordering objective over additive MNN's.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for providing fast automatic explanations of scored observations, the method comprising:
    training, by at least one processor, a predictive model using input observations from a data set, the data set comprising historical observations and corresponding outcomes from past activities, wherein the predictive model is trained using the historical observations and the corresponding outcomes to generate predictions for future observations;
    deriving a plurality of past scored observations from the trained predictive model;
    generating a plot of one-dimensional partial dependence functions (PDFs) based at least in part on the plurality of past scored observations derived from the trained predictive model, wherein each of the plot of PDFs corresponds with each of a plurality of predictive attributes associated with the data set, wherein each of the plot of the PDFs represents a relationship between a single predictive attribute and a predicted outcome of the trained predictive model while other predictive attributes remain constant;
    storing the plot of one-dimensional PDFs in a look-up table of a computing system along with the trained predictive model;
    generating a present scored observation for a present activity using the predictive model; and
    generating a combined explanation for the present scored observation by retrieving the look-up table in real time, wherein the combined explanation comprises one or more explanations that are associated with one or more of the plurality of predictive attributes.

2. The method of claim 1, wherein the predictive model comprises a multi-layered collection of processing neurons to define a multi-layered neural network (MNN) to model a score function for scoring an observation of an activity, and wherein a connectivity between layers of the multi-layered collection of processing neurons of the MNN is restricted to inhibit the score function from modeling interactions between at least some of the input observations to produce a plurality of nonlinear univariate functions.

3. The method of claim 1, further comprising calculating a score loss of the present scored observation for at least one predictive attribute.

4. The method of claim 1, wherein the generating the one or more explanations is performed independently of the generating the present scored observation.

5. The method of claim 3, further comprising: for at least one input value of the present scored observation, querying the look-up table for a match or nearest partial dependence values from the plot of one-dimensional PDFs.

6. The method of claim 5, further comprising: sorting the matched or nearest partial dependence value associated with the at least one input value based on the associated score loss.

7. The method of claim 6, further comprising: generating a list of explanations associated with the sorted dependence values, the list of explanations being configured for output of a predetermined portion of the list of explanations by an explanation system.

8. A system, comprising:
    a programmable processor; and
    a non-transient machine-readable medium storing instructions that, when executed by the processor, cause the programmable processor to perform operations comprising:
        training, by at least one processor, a predictive model using input observations from a data set, the data set comprising historical observations and corresponding outcomes from past activities, wherein the predictive model is trained using the historical observations and the corresponding outcomes to generate predictions for future observations;
        deriving a plurality of past scored observations from the trained predictive model;
        generating a plot of one-dimensional partial dependence functions (PDFs) based at least in part on the plurality of past scored observations derived from the trained predictive model, wherein each of the plot of PDFs corresponds with each of a plurality of predictive attributes associated with the data set, wherein each of the plot of the PDFs represents a relationship between a single predictive attribute and a predicted outcome of the trained predictive model while other predictive attributes remain constant;
        storing the plot of one-dimensional PDFs in a look-up table of a computing system along with the trained predictive model;
        generating a present scored observation for a present activity using the predictive model; and
        generating a combined explanation for the present scored observation by retrieving the look-up table in real time, wherein the combined explanation comprises one or more explanations that are associated with one or more of the plurality of predictive attributes.

9. The system of claim 8, wherein the predictive model comprises a multi-layered collection of processing neurons to define a multi-layered neural network (MNN) to model a score function for scoring an observation of an activity, and wherein a connectivity between layers of the multi-layered collection of processing neurons of the MNN is restricted to inhibit the score function from modeling interactions between at least some of the input observations to produce a plurality of nonlinear univariate functions.

10. The system of claim 8, wherein the operations further comprise calculating a score loss of the present scored observation for at least one predictive attribute.

11. The system of claim 8, wherein the generating the one or more explanations is performed independently of the generating the present scored observation.

12. The system of claim 10, wherein the operations further comprise: for at least one input value of the present scored observation, querying the look-up table for a match or nearest partial dependence values from the plot of one-dimensional PDFs.

13. The system of claim 12, wherein the operations further comprise: sorting the matched or nearest partial dependence value associated with the at least one input value based on the associated score loss.

14. The system of claim 13, wherein the operations further comprise: generating a list of explanations associated with the sorted dependence values, the list of explanations being configured for output of a predetermined portion of the list of explanations by an explanation system.

15. A non-transitory computer-readable medium storing instructions, which when executed by at least one data processor, result in operations comprising:
- training, by at least one processor, a predictive model using input observations from a data set, the data set comprising historical observations and corresponding outcomes from past activities, wherein the predictive model is trained using the historical observations and the corresponding outcomes to generate predictions for future observations;
- deriving a plurality of past scored observations from the trained predictive model;
- generating a plot of one-dimensional partial dependence functions (PDFs) based at least in part on the plurality of past scored observations derived from the trained predictive model, wherein each of the plot of PDFs corresponds with each of a plurality of predictive attributes associated with the data set, wherein each of the plot of the PDFs represents a relationship between a single predictive attribute and a predicted outcome of the trained predictive model while other predictive attributes remain constant;
- storing the plot of one-dimensional PDFs in a look-up table of a computing system along with the trained predictive model;
- generating a present scored observation for a present activity using the predictive model; and
- generating a combined explanation for the present scored observation by retrieving the look-up table in real time, wherein the combined explanation comprises one or more explanations that are associated with one or more of the plurality of predictive attributes.

16. The non-transitory computer-readable medium of claim 15, wherein the predictive model comprises a multi-layered collection of processing neurons to define a multi-layered neural network (MNN) to model a score function for scoring an observation of an activity, and wherein a connectivity between layers of the multi-layered collection of processing neurons of the MNN is restricted to inhibit the score function from modeling interactions between at least some of the input observations to produce a plurality of nonlinear univariate functions.

17. The non-transitory computer-readable medium of claim 15, wherein the operations further comprise calculating a score loss of the present scored observation for at least one predictive attribute.

18. The non-transitory computer-readable medium of claim 15, wherein the generating the one or more explanations is performed independently of the generating the present scored observation.

19. The non-transitory computer-readable medium of claim 17, wherein the operations further comprise: for at least one input value of the present scored observation, querying the look-up table for a match or nearest partial dependence values from the plot of one-dimensional PDFs.

20. The non-transitory computer-readable medium of claim 19, wherein the operations further comprise: sorting the matched or nearest partial dependence value associated with the at least one input value based on the associated score loss.

* * * * *